No. 689,772. Patented Dec. 24, 1901.
D. WRIGHT & J. H. HOWARD.
NUT LOCK FOR RAILWAY RAILS.
(Application filed May 11, 1901.)
(No Model.)
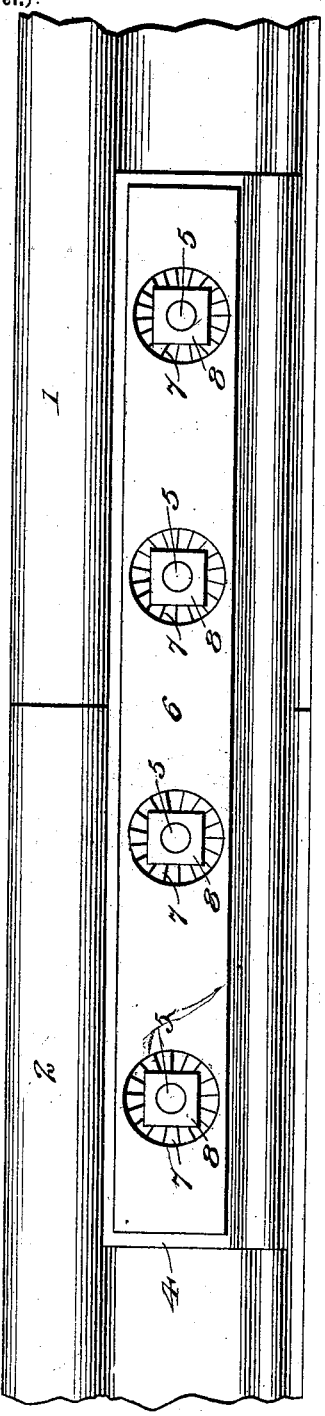
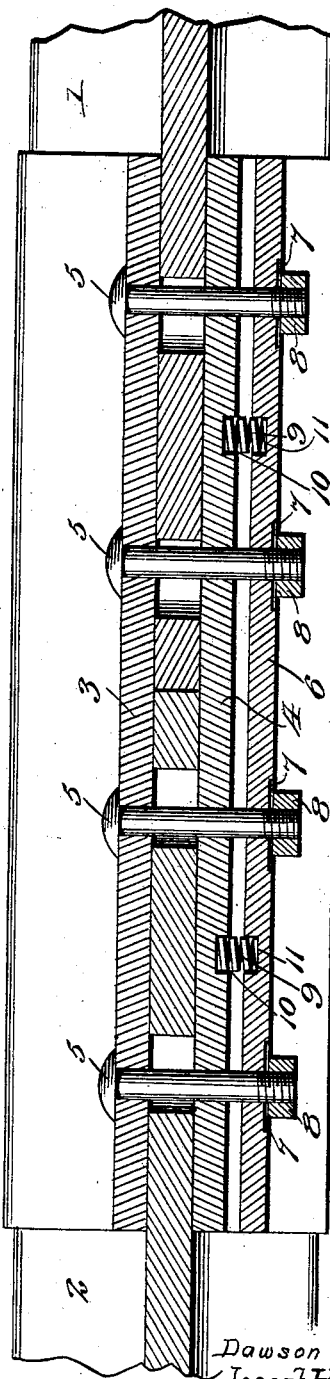
Witnesses
Edwin H. McKee
H. Schmidt
Inventors
Dawson Wright
Joseph H. Howard
By Victor J. Evans
Attorney
THE NORRIS PETERS CO., PHOTO-LITHO., WASHINGTON, D. C.

UNITED STATES PATENT OFFICE.

DAWSON WRIGHT AND JOSEPH H. HOWARD, OF KANSAS CITY, MISSOURI.

NUT-LOCK FOR RAILWAY-RAILS.

SPECIFICATION forming part of Letters Patent No. 689,772, dated December 24, 1901.

Application filed May 11, 1901. Serial No. 59,859. (No model.)

*To all whom it may concern:*

Be it known that we, DAWSON WRIGHT and JOSEPH H. HOWARD, citizens of the United States, residing at Kansas City, in the county of Jackson and State of Missouri, (whose post-office address is 429 West Thirteenth street,) have invented new and useful Improvements in Nut-Locks for Railway-Rails, of which the following is a specification.

This invention relates generally to nut-locks, but is particularly applicable to railway-rails; and the primary object thereof is to provide a cheap, simple, and durable construction of lock whereby the strain on the bolt due to the expansion and contraction of the rails and fish-plates, as well as the excessive vibration thereof incident to the traversing of the rails by the engine, will be relieved.

It is a well-known fact that the expansion of rails in the ordinary construction of roads is a material feature to be considered when the said rails are being laid, inasmuch as the bolts are liable to draw, and if the nuts are securely fastened to the threads thereof this drawing will cause said bolts to become loose when the metal contracts, thereby destroying the tight joint in the rails, which is so desirable. It is the purpose of our invention to overcome this objection; and with this object in view the invention consists in providing a secondary bar adjacent the fish-plates and interposing suitable spring resistance between said fish-plates and bar, whereby the strain will be relieved.

The peculiar manner of accomplishing the desired result will be described hereinafter and illustrated in the accompanying drawings, in which—

Figure 1 is a side elevation of a rail-joint, showing the application of our invention; and Fig. 2 is a longitudinal transverse section through the same.

Referring now to the drawings by numerals of reference, 1 and 2 designate the ends of a pair of rails secured together by the ordinary fish-plates 3 and 4.

The reference-numerals 5 designate the bolts which are ordinarily used to fasten said fish-plates together. In this instance the bolts are slightly longer than those ordinarily employed and project through suitable openings in a secondary bar 6, arranged adjacent to one of the fish-plates and provided with suitable ratchet-faces 7, designed to abut against the inner face of the nuts 8, and thereby prevent the rotation thereof. This bar is spaced a slight distance from the fish-plate and is held away therefrom by means of interposed springs 9, seated in recesses 10 in the fish-plates 11 and in the secondary bar. Inasmuch as the bolts are rigidly secured to said bar and carried thereby, it will be apparent that any vibration caused by the pounding of the wheels upon the rails will be readily compensated for by said springs and that the expansion and contraction of the rails and fish-plate resulting from the variations in temperature will not materially affect the bolts.

We have illustrated and described what to us appears to be the very best means of accomplishing the desired result; but we do not limit ourselves to the exact details shown, but reserve the right to make such changes from time to time as might suggest themselves and still be within the spirit of our invention. For instance, we might employ leaf-springs or any other perfect form of spring in lieu of the coil-springs shown, or the form of ratchet-face may be varied.

From the foregoing it will be apparent that the joint will at all times be kept tight, and the liability of the rails spreading will be reduced to a minimum. As the tension will at all times be upon the bolts caused by the spring, the liability of said bolts turning and thus becoming detached from the nuts will also be reduced.

Having thus fully described our invention, what we claim, and desire to secure by Letters Patent, is—

The combination with a rail-joint having the usual fish-plates and securing-bolts, of a secondary bar arranged adjacent to one of the fish-plates and formed with bolt-holes surrounded on the outer side of the bar by ratchet-teeth; ratchet-faced nuts on the bolts, adapted to engage the ratchet-teeth of the bar, and springs interposed between the bar and adjacent fish-plate whereby all of the nuts may be released simultaneously by pressure on said bar.

In testimony whereof we affix our signatures in presence of two witnesses.

DAWSON WRIGHT.
JOSEPH H. HOWARD.

Witnesses:
H. C. BOSTON,
CHAS. E. NEAL.